United States Patent [19]
King

[11] Patent Number: 5,926,354
[45] Date of Patent: Jul. 20, 1999

[54] SOLID STATE RELAY AND CIRCUIT BREAKER

[75] Inventor: Ray J. King, Carolina Beach, N.C.

[73] Assignee: International Rectifier Corporation, El Segundo, Calif.

[21] Appl. No.: 09/007,627

[22] Filed: Jan. 15, 1998

Related U.S. Application Data

[60] Provisional application No. 60/049,353, Jun. 11, 1997.

[51] Int. Cl.$^6$ ........................................................ H02H 3/00
[52] U.S. Cl. .............................. 361/93; 361/100; 361/115
[58] Field of Search ................................ 361/88, 93, 100, 361/115, 23, 86, 101

[56] References Cited

U.S. PATENT DOCUMENTS 4,721,869   1/1988   Okado ........................................ 361/88

Primary Examiner—Jeffrey Gaffin
Assistant Examiner—Stephen W. Jackson
Attorney, Agent, or Firm—Ostrolenk, Faber, Gerb & Soffen, LLP

[57] ABSTRACT

A current interruption circuit for interrupting current flow from a source of DC power to a load includes: an electronically controllable primary switch device adapted to be series coupled between the DC power source and the load, the primary switch device having a voltage thereacross which is proportional to a current flowing therethrough when biased in an on state. The circuit also includes a voltage sensing circuit adapted to sense the voltage across the primary switch device and produce a control signal in response thereto; and a gate drive circuit adapted to receive the control signal and bias the primary switch in an off state when the control signal indicates that the voltage across the primary switch has exceeded a predetermined value.

13 Claims, 1 Drawing Sheet

SOLID STATE RELAY AND CIRCUIT BREAKER

CROSS REFERENCE TO RELATED APPLICATION

This application is based on and claims priority to U.S. Provisional patent application No. 60/049,353, filed Jun. 11, 1997 entitled RELAY/CIRCUIT BREAKER.

BACKGROUND OF THE INVENTION

1. Field of the Invention

This invention relates to integrated circuits and, more specifically, relates to a solid state integrated circuit which acts as a "high-side" switch and can replace and perform the function of an automotive fuse.

2. Related Art

With reference to FIG. 1, a prior art circuit providing over current protection of a load in a circuit, such as an automotive circuit, is shown. The circuit includes a battery 10, a fuse 12, and a load 14. As is known in the art, if a short circuit should occur, for example in the load 14, the fuse 12 will interrupt current flow from the battery 10 to the load 14, thereby protecting the circuit from catastrophic failure. In performing its function, the fuse 12 has a filament which literally melts in order to interrupt current therethrough. Accordingly, in order to restore the circuit to normal operation, the fuse 12 must be replaced, invariably by a human operator.

Unfortunately, the prior art circuit of FIG. 1 requires a maintenance operation involving a human operator which is inconvenient to the user of the circuit (for example, the driver of an automobile) and may be unnecessarily costly.

Accordingly, there is a need in the art for a new circuit capable of performing a circuit breaker function which does not require a maintenance operation by a human operator after an over current condition has occurred.

SUMMARY OF THE INVENTION

In order to overcome the disadvantages of the prior art, the circuit of the present invention includes an electronically controllable primary switch device adapted to be series coupled between a DC power source and a load, the primary switch device having a voltage thereacross which is proportional to a current flowing therethrough when biased in an on state. The circuit also includes a voltage sensing circuit adapted to sense the voltage across the primary switch device and produce a control signal in response thereto; and a gate drive circuit adapted to receive the control signal and bias the primary switch in an off state when the control signal indicates that the voltage across the primary switch has exceeded a predetermined value.

Other features and advantages of the present invention will become apparent from the following description of the invention which refers to the accompanying drawings.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENT

Figure 1:
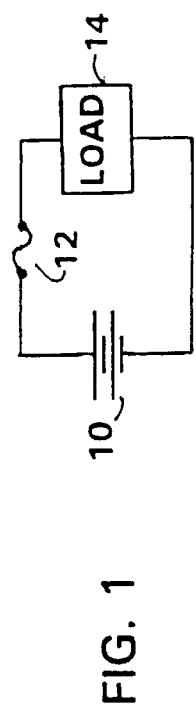
FIG. 1 is a schematic diagram of fuse circuit of the prior art.
Figure 2:
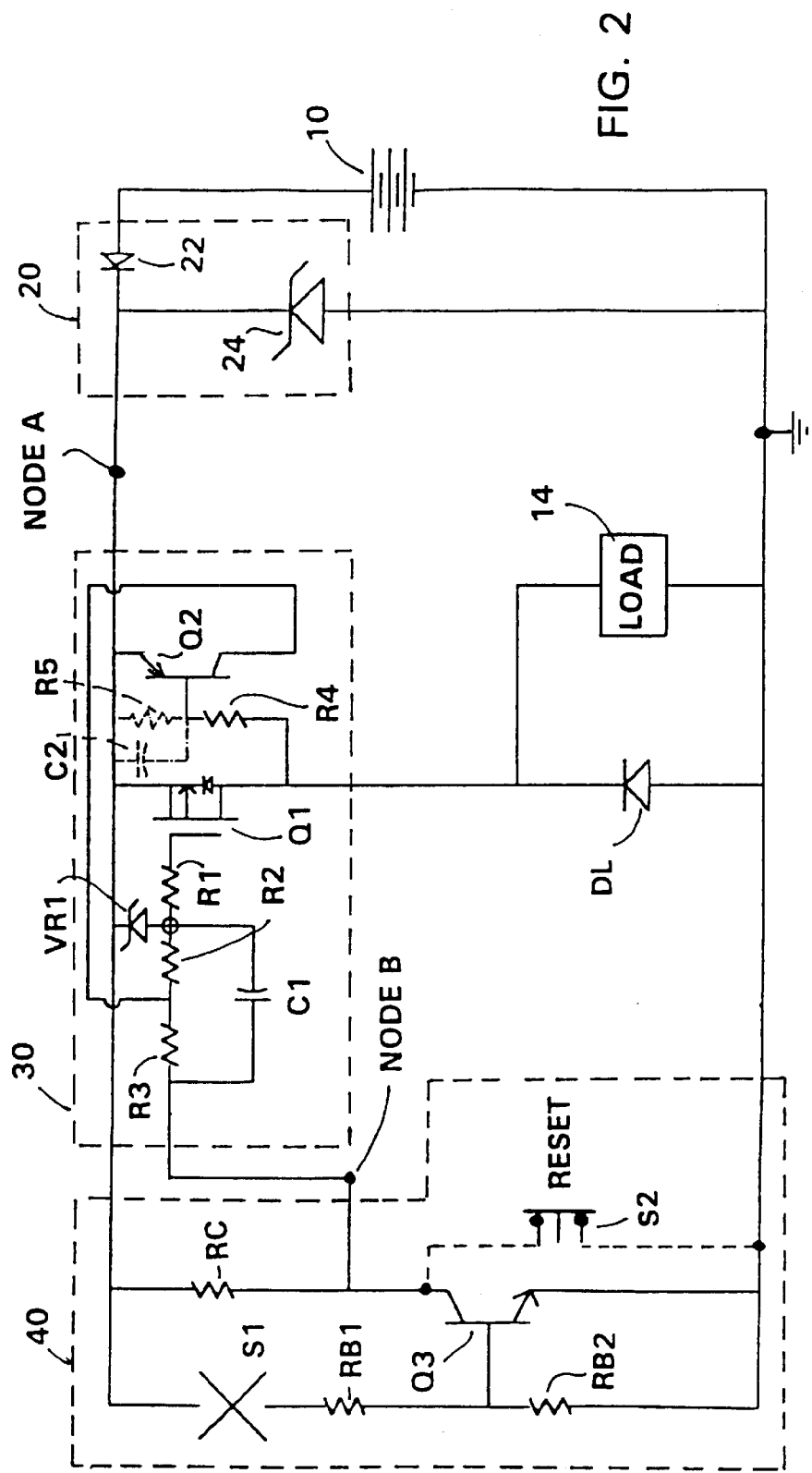
FIG. 2 shows a schematic diagram of the solid state relay and circuit breaker of the present invention.

Referring now to the drawings wherein like numerals indicate like elements, there is shown in FIG. 2 a schematic diagram of a solid state circuit breaker in accordance with the present invention. The circuit includes a battery 10, a battery protection circuit 20, a current interruption circuit 30, a reset circuit 40, and a load 14.

The battery protection circuit 20 includes a diode 22 coupled in series with the battery 10 and a zener diode 24 coupled in shunt with the series combination of the battery 10 and diode 22. The diode 22 protects any circuit connected to the battery 10 from a reverse battery connection because current can only flow from the battery 10 when the anode of the diode 22 is coupled to the positive terminal of the battery 10.

The zener diode 24 of the battery protection circuit 20 functions as a "load dump" circuit which prevents the voltage at node A to ground from exceeding a predetermined value, such as 30 volts. The zener diode 24 acts as a clamp circuit when, for example, the current interruption circuit 30 interrupts current from the battery 10. During such current interruption, stray inductance of the circuit may otherwise cause voltage spikes to appear at node A with respect to ground. The zener diode 24, however, prevents the voltage at node A from exceeding a predetermined value, thereby protecting the battery 10 and any other circuit coupled from node A to ground.

The current interruption circuit 30 is coupled between the battery 10 and the load 14. The current interruption circuit 30 is adapted to prevent current from flowing from the battery 10 to the load 14 when the current flowing into the load 14 exceeds a predetermined value. It is preferred that the current interruption circuit 30 remain in a "latched-off state" (i.e., no current flow) after the predetermined level of current flowing into the load 14 has occurred (i.e., an over current condition has occurred).

The current interruption circuit 30 is also adapted to reset in response to either a manual or electronic command such that current flow from the battery 10 to the load 14 may be resumed. Advantageously, the resetting feature of the current interruption circuit 30 via an electronic command signal eliminates the requirement of a maintenance action by a human operator.

The circuit of FIG. 2 also includes a diode DL coupled in an anti-parallel configuration with the load 14. The diode DL permits current to free-wheel through the load in the event that a stray inductance of the load 14 causes a reverse voltage thereacross. Without the diode DL, a voltage spike might occur across the load 14. Thus, diode DL acts a voltage clamp preventing the reverse voltage across the load 14 from exceeding approximately one diode drop.

The current interruption circuit 30 will now be discussed in more detail. The circuit 30 includes a primary switching device Q1, preferably a P-channel MOSFET, coupled in series between the battery 10 and the load 14. The current interruption circuit 30 further includes a voltage sensing circuit (comprising transistor Q2 and resistor R4) and a gate drive circuit (comprising resistors R1–R3, zener diode VR1, and capacitor C1).

The operation of the current interruption circuit 30 is as follows. Initially, a control node (node B) of the current interruption circuit 30 is in a high impedance state or pulled up to the battery voltage potential. Consequently, transistor Q1 is in an off-state where the voltage from source to drain is substantially equal to the battery voltage. Transistor Q2, therefore, is biased on (i.e., base current flows from the emitter of Q2 through resistor R4) and a voltage potential of approximately the battery voltage appears at the junction between R2 and R3. Capacitor C1 is substantially discharged through resistors R2 and R3 (as well as through VR1 if the control node B is pulled up to the battery potential). Accordingly, the voltage from gate to source of transistor Q1 is substantially zero volts, thereby maintaining transistor Q1 in the off-state.

When delivery of current from the battery 10 to the load 14 is desired, the control node B is operatively coupled to ground (the details of operatively connecting node B to ground will be discussed in more detail below). When node B is coupled to ground, current flows from node A through the gate to source capacitance of transistor Q1, resistor R1, and capacitor C1 to ground. Capacitor C1 is selected to be much larger in value than the gate to source capacitance of transistor Q1. Therefore, the voltage from source to gate VSG of transistor Q1 charges to approximately the battery voltage and the voltage across capacitor C1 does not substantially increase. Zener diode VR1 limits the voltage from source to gate VGS of transistor Q1 to preferably about 15 volts. Since the gate of transistor Q1 is biased to a voltage below that of the source, transistor Q1 turns on and delivers current to the load 14.

When transistor Q1 turns on, the voltage from source to drain VSD of transistor Q1 is substantially reduced and adheres to the following equation: $VSD=I^2 \times RDSon$, where RDSon is the resistance from drain to source of transistor Q1. Since RDSon is substantially small when transistor Q1 is turned on, VSD is lower than approximately 0.6 volts and transistor Q2 is therefore biased off. Consequently, current is permitted to flow from the battery 10 through transistor Q1 to the load 14 as required.

If the current through transistor Q1 is substantially increased, for example, due to a short circuit, VSD will increase and exceed 0.6 volts, thereby biasing transistor Q2 on. When transistor Q2 turns on, capacitor C1 charges from about 0 volts towards the battery voltage through resistor R2. As capacitor C1 charges, the gate to source capacitance of transistor Q1 discharges through transistor Q2, R2 and R1. Consequently, transistor Q1 biases off and VSD abruptly increases to approximately the battery voltage, thereby further biasing transistor Q2 on and latching transistor Q1 in the off state.

When it is desirable to reset the current interruption circuit 30 to deliver current from battery 10 to the load 14, control node B is released from ground potential (and possibly pulled up to the battery voltage) momentarily. While node B is released from ground potential, capacitor C1 discharges through resistors R2 and R3 (and VR1 if node B is coupled to the battery potential). Subsequently, node B is again coupled to ground which charges the gate to source capacitance of transistor Q1, thereby turning transistor Q1 on as discussed above.

One example of a circuit suitable for controlling node B is shown as the reset circuit 40. Reset circuit 40 includes an NPN transistor Q3, a pull-up resistor RC, base bias resistors RB1 and RB2, and control switch S1. When control switch S1 is conducting, transistor Q3 turns on and node B is coupled to ground potential. When control switch S1 is not conducting, transistor Q3 is biased off and node B is coupled to the battery potential through pull up resistor RC. It is noted that many other variations of the reset circuit 40 may be employed by those skilled in the art in light of the above teaching.

As will be apparent to one skilled in the art from the above, normally closed switch S2 is a reset switch which my be used instead of transistor Q3.

Advantageously, the control of the current interruption circuit 30 by way of control node B may be facilitated via control switch S1 (manipulated by a human operator) or by way of electronic control (for example, computer control) using a suitable reset circuit 40. Therefore, a fuse maintenance action may be avoided.

Capacitor C2 and resistor R5 may be included in the voltage sensing circuit, particularly in the base drive circuit of transistor Q2, to improve the turn on and turn off characteristics of transistor Q2.

It is noted that the relay and circuit breaker circuit of the present invention is similar in some respects to the IR 6000 line of solid state integrated circuits available from the International Rectifier Corporation of El Segundo, Calif., but has functions specifically adapted to be used in place of an automotive fuse.

As may be apparent to those skilled in the art, an LED (not shown) may be adapted to illuminate when an over current condition occurs as sensed by the voltage sensing circuit of the current interruption circuit 30.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A current interruption circuit which functions as a resettable fuse for interrupting current flow from a single source of DC power to a load, the current interrupting circuit comprising:
   a DC power source;
   a load;
   an electronically controllable primary switch device adapted to be series coupled between the DC power source and the load, the primary switch device having a voltage thereacross which is proportional to a current flowing therethrough when biased in an on state;
   a voltage sensing circuit adapted to sense the voltage across the primary switch device and produce a control signal in response thereto; and
   a gate drive circuit adapted to receive the control signal and bias the primary switch in an off state when the control signal indicates that the voltage across the primary switch has exceeded a predetermined value,
   wherein the DC power source consists of a sole power source in the entire current interruption circuit.

2. The current interruption circuit of claim 1, wherein the gate drive circuit includes a control terminal, the gate drive circuit being enabled to turn on the primary switching device only when the control terminal is coupled to a first predetermined voltage level.

3. The current interruption circuit of claim 2, wherein the voltage sensing circuit and the gate drive circuit are adapted to latch the primary switching device in the off state after the voltage across the primary switch has exceeded the predetermined value.

4. The current interruption circuit of claim 3, wherein the voltage sensing circuit and the gate drive circuit are adapted to permit the primary switching device to enter the on state when the control terminal is released from the first predetermined level, coupled to a second predetermined voltage level, and again coupled to the first predetermined voltage level.

5. The current interruption circuit of claim 4, further including a reset circuit operatively coupled to the control terminal, the reset circuit being adapted to couple the control terminal to the first and second predetermined voltage levels.

6. The current interruption circuit of claim 4, further including a reset circuit operatively coupled to the control terminal, the reset circuit being adapted to couple the control terminal to the first and second predetermined voltage levels in response to an electronic control operating under a control program.

7. The current interruption circuit of claim 4, further including a reset circuit operatively coupled to the control terminal, the reset circuit being adapted to couple the control terminal to the first and second predetermined voltage levels in response to a human operator.

8. The current interruption circuit of claim 2, wherein the primary switching device is a P-channel MOSFET, a source of the MOSFET being operatively coupled toward the DC source and a drain of the MOSFET being operatively coupled toward the load.

9. The current interruption circuit of claim 8, wherein the voltage sensing circuit includes a PNP transistor, a base of the PNP transistor being operatively coupled to the drain of the MOSFET, an emitter of the PNP transistor being operatively coupled to the source of the MOSFET, and a collector of the PNP transistor providing the control signal to the gate drive circuit.

10. The current interruption circuit of claim 8, wherein the gate drive circuit includes a charging capacitor coupled at one end to the control terminal and at another end to the gate of the MOSFET such that the gate is biased below the source when the control terminal is coupled to the first predetermined voltage level.

11. The current interruption circuit of claim 10, wherein the charging capacitor has a value substantially greater than a gate-to-source capacitance of the MOSFET.

12. The current interruption circuit of claim 10, wherein the gate drive circuit including at least two series coupled impedances connected in parallel with the charging capacitor, the impedances maintaining the gate potential substantially below the source potential when the control terminal is coupled to the first predetermined voltage level and the control signal indicates that the voltage across the MOSFET is below the predetermined value.

13. The current interruption circuit of claim 12, wherein the impedances are resistors, the voltage sensing circuit includes a PNP transistor, a base of the PNP transistor is operatively coupled to the drain of the MOSFET, an emitter of the PNP transistor is operatively coupled to the source of the MOSFET, and a collector of the PNP transistor provides the control signal to the junction of the resistors.

* * * * *